L. I. YEOMANS.
PROCESS OF MANUFACTURING THE BEARINGS OF GUN BORING MACHINES.
APPLICATION FILED JUNE 27, 1918.
1,309,388. Patented July 8, 1919.
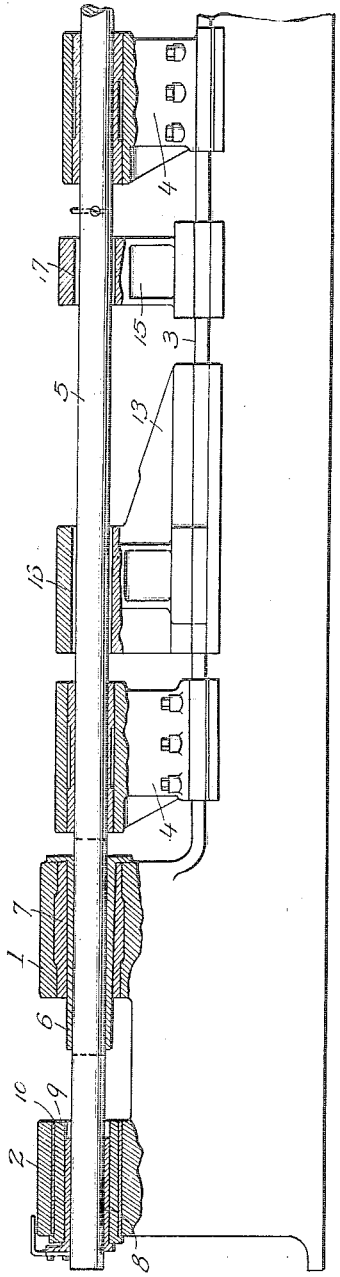
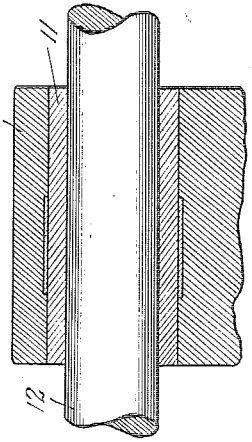
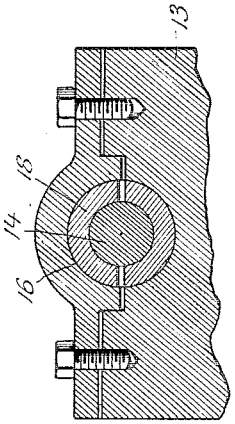
Witnesses
Arthur W. Carlson
Robert H. Weir
Inventor
L. I. Yeomans
By Miller, Chindahl & Parker,
Attys.

UNITED STATES PATENT OFFICE.

LUCIEN I. YEOMANS, OF CHICAGO, ILLINOIS, ASSIGNOR TO AMALGAMATED MACHINERY CORPORATION, OF CHICAGO, ILLINOIS, A CORPORATION OF DELAWARE.

PROCESS OF MANUFACTURING THE BEARINGS OF GUN-BORING MACHINES.

1,309,388.  Specification of Letters Patent.  Patented July 8, 1919.

Application filed June 27, 1918. Serial No. 242,190.

*To all whom it may concern:*

Be it known that I, LUCIEN I. YEOMANS, a citizen of the United States, residing at Chicago, in the county of Cook and State of Illinois, have invented a certain new and Improved Process of Manufacturing the Bearings of Gun-Boring Machines and the like, of which the following is a specification.

In a gun-boring machine, the head-stock spindle and the boring bar must be accurately alined. The great length of such a machine, however, has made it difficult to obtain such alinement. The object of the present invention is to provide a method of attaining accurate alinement of the various bearings in such a machine.

In the accompanying drawings, Figure 1 is a view, more or less diagrammatic, showing a portion of a gun-boring machine, and illustrating steps in the process of forming the bearings. Figs. 2 and 3 illustrate two completed bearings.

In the drawings, 1 and 2 denote the spindle bearings of the gun-boring machine, and 3 are the finished carriage ways. The horizontal and vertical surfaces of these ways are utilized as the datum planes, so to speak, from which the location of the bores of the various bearings is determined.

Two master boring-bar guides 4 are mounted upon the ways 3 to support a boring-bar 5. Any suitable means may be provided for rotating, advancing and retracting the bar 5, as, for example, that shown in my application Serial No. 266,408, filed Dec. 12, 1918.

The boring bar 5 is to be employed as a mandrel to locate a bearing bushing in the bearing 2. However, as the distance from the bearing 2 to the nearest master boring-bar guide is considerable, there would be a slight deflection in said bar. Hence, before using the bar to locate the permanent bushing in the bearing 2, a temporary support for the bar 5 is first provided in the bearing 1. This temporary support consists of a bushing 6 which fits nicely upon the bar 5, and is inserted into the bearing 1, a master boring-bar guide 4 being positioned upon the ways 3 as close as conveniently possible to the bearing 1. While said bushing is supported upon the bar 5 within the bearing 1, Babbitt metal or the like 7 is employed to secure the temporary bushing 6 in place. The bar 5 is then advanced into the bearing 2, a spacer sleeve 8 is slipped upon the bar 5, the permanent bushing 9 is placed upon said sleeve, and the permanent bushing 9 is secured in the bearing 2 by means of babbitt or the like 10. The bushing 9 constitutes one of the bearings for the head-stock spindle of the gun-boring machine.

After the bushing 9 has been secured in place, the boring-bar 5 is withdrawn from the bearings 1 and 2. The temporary bushing 6 is then removed from the bearing 1 by pressing it therefrom, said bushing preferably being exteriorly tapered to facilitate its removal. The boring-bar is then advanced into the sleeve 8, a suitable tool is attached to the bar, and the bar is rotated and advanced to bore out the bearing 1 down to the iron. During this operation, the boring bar is supported by the sleeve 8 and the adjacent master boring-bar guide 4. The boring-bar is then retracted and the permanent bearing bushing 11 (Fig. 3) is pressed into the hole bored in the bearing 1. The bushing 11 constitutes the other bearing for the head-stock spindle 12.

The gun-boring machine comprises a carriage 13 to which the boring-bar 14 of the gun-boring machine is rigidly secured and by means of which said boring bar is advanced and retracted. The gun-boring machine also comprises a suitable number of guides 15 slidably mounted upon the carriage ways 3 and arranged to support the boring-bar 14 of the gun-boring machine.

After the bearing bushing 11 has been put in place, the bar 5 is utilized to bore out an opening 16 in the carriage 13 to receive a bushing for the boring-bar of the gun-boring machine, and to bore out an opening 17 to receive a bearing bushing for said bar in each bar guide 15. For this purpose the carriage 13 is mounted upon the ways 3 between the master boring-bar guides 4, and the opening 16 bored out to receive a split or clamp bushing 18. The carriage 13 is then lifted off the ways and the bar guides 15 are set upon the ways and bored out to receive bearing bushings for the boring bar of the gun-boring machine. While the openings 16 and 17 of the carriage 13 and the bar guides 15 are being bored out, the boring bar 5 is supported relatively close to the work by the master boring-bar guides 4.

It will be seen that the master boring-bar guides 4 are mounted upon the finished carriage ways 3, that the openings in the carriage 13 and the bar-guides 15 are bored out while said carriage and bar guides are mounted on the carriage ways, and that the boring-bar serves as a mandrel in forming bearings for the head-stock spindle. Thus it will be evident that the head-stock-spindle bearings, the bearings on the bar guides 15 and the clamp on the carriage 13 will be accurately alined with one another.

The term "slidable element" is used in the appended claims to denote the carriage or bar guide of the gun-boring machine.

I claim as my invention:

1. The process of manufacturing the head-stock-spindle bearings of a gun-boring machine or the like, which consists in supporting a boring-bar in a guide located adjacent to one of said bearings, utilizing said boring bar as a mandrel to support a temporary bearing bushing in said adjacent bearing, babbitting said bushing in place in said adjacent bearing, advancing the boring bar into the other bearing and there utilizing the boring-bar as a mandrel to support a bearing bushing, babbitting said last mentioned bearing bushing permanently in place, removing the temporary bushing and operating the boring-bar to bore out the bearing in which said temporary bushing was located while the boring bar is supported in the other bearing bushing and said guide.

2. The process of manufacturing the head-stock-spindle bearings of a gun-boring machine or the like, which consists in supporting a boring-bar in a guide located adjacent to one of said bearings, utilizing said boring bar as a mandrel to support a temporary bearing bushing in said adjacent bearing, securing said bushing temporarily in place in said adjacent bearing, advancing the boring-bar into the other bearing and there utilizing the boring-bar as a mandrel to support a bearing bushing, securing said last mentioned bearing bushing permanently in place, removing the temporary bushing, and operating the boring bar to bore out the bearing in which said temporary bushing was located while the boring bar is supported in the other bearing bushing and said guide.

3. The process of manufacturing one of two alined head-stock-spindle bearings of a gun-boring machine or the like, which consists in supporting a boring-bar in one of said bearings, utilizing said boring-bar as a mandrel to support a temporary bearing bushing in the last mentioned bearing, securing said bushing temporarily in place in said last mentioned bearing, advancing the boring-bar into the other bearing and there utilizing the boring-bar as a mandrel to support a bearing bushing, and securing said last mentioned bearing bushing permanently in place.

4. The process of manufacturing one of two alined head-stock-spindle bearings of a gun-boring machine or the like, which consists in passing a boring-bar through said bearings, supporting the boring-bar within the farther bearing, and, while so supporting the bar, utilizing the bar to bore out the other bearing.

5. The process of manufacturing the head-stock-spindle bearings and the bearing of the slidable element of a gun-boring machine or the like having finished ways to support said element, which consists in mounting a master boring-bar guide on said ways, utilizing the boring-bar carried by said master boring-bar guide as a mandrel in positioning and securing a bearing bushing in one of the spindle bearings, utilizing said boring-bar while supported in said bearing bushing to bore out the other spindle bearing, placing the slidable element upon said finished ways, and utilizing the boring-bar to bore out a bearing in said slidable element while said boring bar is supported in said master boring-bar guide.

6. The process of manufacturing the bearing in the slidable element of a gun-boring machine or the like having finished ways to support said element, which consists in mounting a master boring-bar guide on said ways, mounting said element upon said ways, and actuating a boring-bar supported in said master boring-bar guide to bore out an opening in said slidable element.

In testimony whereof, I have hereunto set my hand.

LUCIEN I. YEOMANS.